United States Patent [19]

Keogh

[11] 4,351,926
[45] Sep. 28, 1982

[54] HEAT CURABLE POLYMER

[75] Inventor: Michael J. Keogh, Bridgewater, N.J.

[73] Assignee: Union Carbide Corporation, Danbury, Conn.

[21] Appl. No.: 106,502

[22] Filed: Dec. 26, 1979

[51] Int. Cl.$^3$ .............................................. C08F 8/42
[52] U.S. Cl. .................................. 525/370; 525/346; 525/359.4; 525/330.6
[58] Field of Search ...................... 525/370, 346, 359.4

[56] References Cited

U.S. PATENT DOCUMENTS

| | | | |
|---|---|---|---|
| 3,491,075 | 1/1970 | Dekking et al. | 260/87.3 |
| 3,904,572 | 9/1975 | Huang et al. | 260/31.2 MR |
| 3,969,434 | 7/1976 | Powell et al. | 525/370 |
| 4,005,247 | 1/1977 | Graham | 525/370 |
| 4,012,567 | 3/1977 | Loveless | 525/370 |
| 4,020,214 | 4/1977 | MacKenzie | 428/389 |
| 4,042,766 | 8/1977 | Tatsukami et al. | 525/370 |
| 4,185,051 | 1/1980 | McKenna et al. | 525/370 |
| 4,292,231 | 9/1981 | Gabriel et al. | 525/370 |

Primary Examiner—William F. Hamrock
Attorney, Agent, or Firm—James C. Arvantes

[57] ABSTRACT

A process for making a heat-curable polymer comprising the steps of:
(a) preparing a mixture comprising:
  alkylene-alkyl acrylate copolymer;
  from 0.1 to 10 parts by weight based on 100 parts by weight of copolymer of difunctional compound having the formula $R_1—R_2—R_3$ wherein $R_1$ and $R_3$ are independently selected from the group consisting of —OH, —SH,

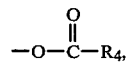

wherein $R_4$ is $C_1$ to $C_{20}$ hydrocarbon; $R_2$ is a divalent organic radical terminated with other than aryl;
  from 0.1 to 10 parts by weight based on 100 parts by weight of the copolymer of organo titanate;
(b) heating said mixture to temperature of between the melting temperature of the copolymer and about 200° C.

15 Claims, No Drawings

HEAT CURABLE POLYMER

BACKGROUND

This invention relates to heat curable polymers. More specifically, this invention relates to heat curable polymers that are particularly useful as coatings for wire or cable.

Prior methods of curing, i.e. crosslinking, polymers include use of various peroxides. A mixture of polymer and a small amount of peroxide is prepared, and the mixture is cured with heat. The difficulty with this method is that the curing process generates volatile compounds which vaporize at curing temperature if the pressure is low. Hence, unless the curing is carried out at high pressure in expensive pressure chambers, the cured polymer will have voids caused by the vaporized material.

Another method of curing polymer is by use of electron beams. However, this method requires expensive electron beam generating apparatus, and is unacceptably slow if the polymer being cured is thick.

U.S. Pat. No. 3,646,155 (Scott) discloses a water curable polymer. However, its manufacturer requires use of relatively expensive silane compounds and requires intimate contact with water to effect cross-linking.

OBJECTS

Accordingly, it is an object of this invention to provide a heat-curable polymer that does not require high pressure during curing.

It is another object of this invention to provide a heat curable polymer that can be cured at rapid rates without the use of high pressure.

It is a further object of this invention to provide a curable polymer that may be manufactured without the use of silane compounds.

SUMMARY OF THE INVENTION

These and other objects are accomplished by the present invention one aspect of which comprises:

A process for making a heat-curable polymer comprising the steps of:

(a) preparing a mixture comprising:
alkylene-alkyl acrylate copolymer;
from 0.1 to 10 parts by weight based on 100 parts by weight of copolymer of difunctional compound having the formula $$R_1-R_2-R_3$$

wherein $R_1$ and $R_3$ are independently selected from the group consisting of —OH, —SH,

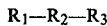

wherein $R_4$ is $C_1$ to $C_{20}$ hydrocarbon; $R_2$ is a divalent organic radical terminated with other than aryl;

from 0.1 to 10 parts by weight based on 100 parts by weight of the copolymer of organo titanate;

(b) heating said mixture to temperature of between the melting temperature of the copolymer and about 200° C.

A second aspect of the invention comprises:

A process for making a heat-curable polymer comprising the steps of:

(a) reacting difunctional compound having the formula:

$$R_1-R_2-R_3$$

wherein $R_1$ and $R_3$ are independently selected from the group consisting of —OH, —SH,

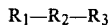

wherein $R_4$ is $C_1$ to $C_{20}$ hydrocarbon; $R_2$ is a divalent organic radical terminated with other than aryl with from 5 to 250 parts by weight based on 100 parts by weight of the difunctional compound of organotitanate at temperature of from 25° C. to 250° C.;

(b) removing volatile material from the step (a) reaction product, and (c) mixing the devolatized reaction product with alkylene-alkyl acrylate copolymer.

A third aspect of the invention comprises:

A process for preparing a heat-curable polymer comprising the steps of mixing (a) alkylene-alkyl acrylate copolymer, (b) from 0 to 10 parts by weight based on 100 parts by weight of the copolymer of difunctional compound having the formula $$R_1-R_2-R_3$$

wherein $R_1$ and $R_3$ are independently selected from the group consisting of —OH, —SH,

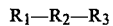

wherein $R_4$ is $C_1$ to $C_{20}$ hydrocarbon; $R_2$ is a divalent organic radical terminated with other than aryl (c) from 0.1 to 10 parts by weight based on 100 parts by weight of copolymer of titanium chelate.

This third aspect requires curing under high pressure if void-free polymer is to be obtained. However, silane compounds are not required.

A fourth aspect of the invention comprises:

A crosslinked copolymer comprising:

(a) alpha olefin units having the formula:

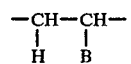

wherein B is selected from the group consisting of hydrogen, $C_1$ to $C_{16}$ alkyl, $C_1$ to $C_{16}$ aryl, $C_1$ to $C_{16}$ alkaryl or combinations thereof, said alpha olefin units being present in the copolymer to the extent of at least 22 weight percent;

(b) cross-linked bridges of the formula:

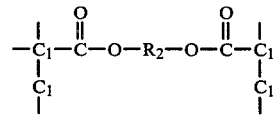

wherein $C_1$ is a carbon atom in a polymer chain, and $R_2$ is a divalent organic radical terminated with other than aryl.

A fifth aspect of the invention comprises:

A process for making a crosslinking agent for crosslinking alkylene-alkyl acrylate copolymer comprising the steps of:

(a) reacting difunctional compound having the formula:

$$R_1-R_2-R_3$$

wherein $R_1$ and $R_3$ are independently selected from the group consisting of —OH, —SH,

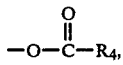

wherein $R_4$ is $C_1$ to $C_{20}$ hydrocarbon; $R_2$ is a divalent organic radical terminated with other than aryl with from 5 to 1000 parts by weight based on 100 parts by weight of the difunctional compound of organotitanate at temperature of from 25° C. to 250° C., (b) removing volatile material from the step (a) reaction product, and (c) mixing the devolatilized step (b) product with inert polymer.

This invention is predicated upon the discovery that when alkylene-alkyl acrylate copolymer, difunctional compounds, and certain titanium compounds are reacted, there results a heat-curable polymer that does not necessarily require high pressure curing. While not wishing to be bound by any particular theory, it is believed that the cured polymer is formed as follows:

First, the titanate, typically a titanate ester, reacts with difunctional compound to form a different titanate ester and volatile alcohol or ester. The alcohol or ester may be removed during the initial compounding step before curing and even before the polymer is molded or extruded to its final form. The structures of the esters so formed are dependent on several factors including the relative mole ratio of titanate and difunctional compound, reaction time and temperature. Upon the application of heat, the esters formed in the first reaction cure the polymer. Overall reactions occurring may be summarized as follows for typical reactants in accordance with the invention:

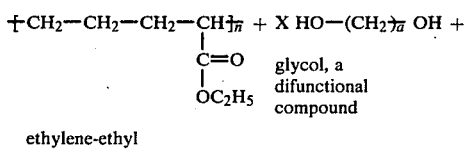

ethylene-ethyl
acrylate copolymer glycol, a
difunctional
compound

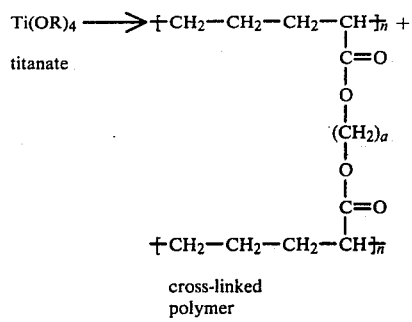

titanate cross-linked
polymer $$Ti(OR)_{4-2x}(OC_2H_5)_{2x}$$

Non-volatile titanate

+

$$2\ X\ R\text{—}OH$$

Volatile alcohol removed
before curing

DETAILED DESCRIPTION OF THE INVENTION

The invention will now be described in terms of its key ingredients: copolymer, difunctional compounds and titanate. Then the preferred means of processing the ingredients into crosslinkable polymers will be discussed.

THE ALKYLENE-ALKYL ACRYLATE COPOLYMER

As used throughout the present specification and claims the term "alkylene-alkyl acrylate copolymer" is intended to mean a copolymer formed by copolymerizing:

(a) olefin monomer having the formula:

$$CH_2=\underset{B}{CH}$$

wherein B is hydrogen, $C_1$ to $C_{16}$ alkyl, aryl, alkaryl or combinations thereof, including but not limited to ethylene, propylene, higher alpha olefins, and styrene.

(b) alkyl acrylate monomer having the formula:

$$CH_2=\underset{B'}{C}-\overset{O}{\underset{\|}{C}}-O-B''$$

wherein B' is hydrogen or $C_1$ to $C_5$ alkyl and B'' is $C_1$ to $C_{18}$ alkyl.

The preferred alkylene-alkyl acrylate copolymer is ethylene-ethyl acrylate copolymer containing from about 1 to about 50 percent by weight ethyl acrylate. The most preferred copolymer is ethylene-ethyl acrylate copolymer containing from 2 to about 20 percent by weight ethyl acrylate.

The alkylene-alkyl acrylate copolymers generally have a density (ASTM 1505 test procedure with conditioning as in ASTM D-148-72) of about 0.90 to 0.96 and a melt index (ASTM D-1238 at 44 psi. tested pressure) of about 0.5 to 500 decigrams per minute.

Another preferred alkylene-alkyl acrylate copolymer is ethylene-butyl acrylate copolymer. Other monomers may be copolymerized with the olefin and alkyl acrylate. Hence ethylene-ethyl acrylate-acrylic acid terpolymers are also acceptable and included in the definition of "alkylene alkyl acrylate" as used in the present specification and claims.

THE DIFUNCTIONAL COMPOUNDS

The difunctional compounds are of the general formula:

$$R_1-R_2-R_3$$

wherein $R_1$ and $R_3$ are independently selected from the group consisting of —OH, —SH,

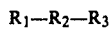

wherein $R_4$ is $C_1$ to $C_{20}$ hydrocarbon. $R_2$ is a divalent organic radical terminated with other than aryl. Hence $R_2$ includes, but is not limited to $C_2$-$C_{20}$ unsubstituted hydrocarbon, including alkyl, cycloalkyl, and alkaryl. $C_2$-$C_{20}$ hydrocarbon partially substituted by halogen, or $$Y^1-X^1+Y^{m+1}-X^{m+1}\}_m Y^{m+2}-$$

wherein m is an integer of 0 to 20, $Y^1$ to $Y^{m+2}$ are independently selected from divalent $C_2$-$C_{20}$ hydrocarbon, and $C_2$-$C_{20}$ hydrocarbon partially substituted by halogen; and $X^1$ to $X^m$ are independently selected from the group consisting of O, S, N, Z, and combinations thereof wherein Z is $C_1$ to $C_{20}$ alkyl.

Preferred difunctional compounds are:

HO—(CH$_2$)$_a$—OH, wherein a is an integer of 2 to 20;

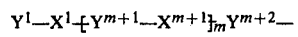

HO—CH$_2$—CH$_2$—O—CH$_2$—CH$_2$—O—CH$_2$—CH$_2$—OH;

HO—CH$_2$—CH$_2$—S—CH$_2$—CH$_2$—OH,

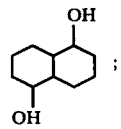

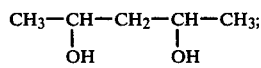

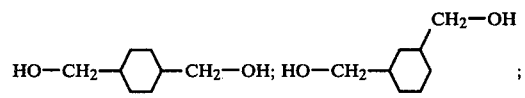

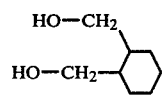

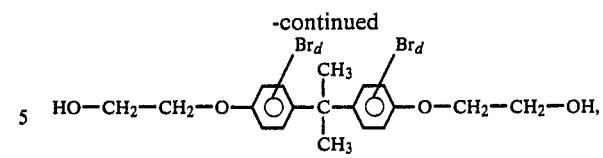

wherein d is an integer of 1 to 4 dibromoneopentyl glycol; and

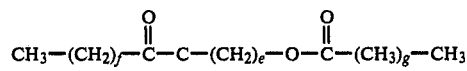

wherein
 e is an integer of 2 to 20; and
 f and g are integers of 0 to 18.

However, difunctional compounds wherein $R_2$ is terminated by aryl are not acceptable. Hence, bisphenol-A, having the formula:

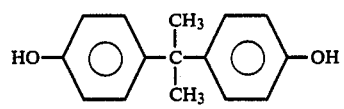

is unacceptable, because its $R_2$

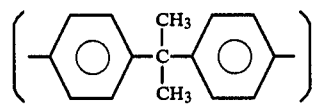

terminates with aryl.

THE ORGANOTITANATE

As used throughout the present specification and claims, the term "organotitanate" is intended to mean a compound of the formula:

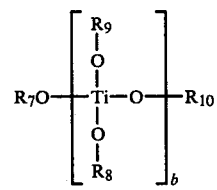

wherein $R_7$, $R_8$, $R_9$ and $R_{10}$ are independently selected from the group consisting of hydrogen, alkyl, cycloalkyl, aryl, alkaryl, aralkyl of 1 to 20 carbon atoms, lactyl and acyl of the formula

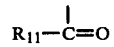

wherein $R_{11}$ is $C_1$ to $C_{20}$ alkyl and b is an integer of from 1 to 100, with the proviso that not all of $R_7$, $R_8$, $R_9$ and $R_{10}$ be H, acyl, or alkaryl. These organo titanates are commercially available materials and are prepared according to the procedures as set forth in U.S. Pat. No. 2,984,641, which patent is incorporated herein by reference.

Preferred titanates are: tetramethyl titanate, tetraethyl titanate, tetraisopropyl titanate, tetrabutyl titanate, tetraoctyl titanate, tetra stearyl titanate, isopropyl (dilauryl myristyl) titanate, and combinations thereof.

The most preferred organo titanates are tetrabutyl titanate and tetraisopropyl titanate.

THE TITANIUM CHELATES

One aspect of the invention uses titanium chelates. As used throughout the present specification and claims, the term "titanium chelate" is intended to mean an organo titanium compound wherein titanium ion is held by coordination bonds. Such titanium chelates are described in the booklet *Versatile TYZOR ® Organic Titanates*, published by E. I. duPont de Nemours & Co., Inc., Wilmington, Delaware. Preferred titanium chelates are: titanium acetyl acetonate, lactic acid titanium chelate, triethanolamine titanium chelate, tetraoctylene glycol titanium chelate, and mixtures thereof.

ADJUVANTS

Adjuvants such as fillers including carbon black, clay, magnesium silicate, calcium carbonate, silicas, aluminum hydroxide, calcium silicate, etc. may be used with the heat curable polymers of this invention in amounts sufficient to produce the intended effect.

The copolymer may be rendered flame retardant by use of known halogen-containing flame retardant additives preferably in admixture with an organic or inroganic antimony compound, e.g. antimony oxide.

Additionally, it is believed that compositions containing the present polymer, halogen-containing flame retardant and at least one of $CaO, CaCO_3, Ca(OH)_2, CaSO_4, MgO, MgCO_3, Mg(OH)_2$, and $MgSO_4$ would have advantageous properties. The halogen-containing flame retardants include decabromodiphenyl oxide, chlorinated polyethylene, polyvinyl chloride, halogenated parafin waxes, and the reaction product of tetrabromophthalic acid anhydride and ethylene diamine.

PROCESSING THE INGREDIENTS

Three methods of processing the ingredients are currently known.

(1) The copolymer, difunctional compound and titanate are mixed and heated to a temperature of between the melting temperature of the copolymer and about 200° C. This is preferably accomplished by pre-blending copolymer and difunctional compound in a blender such as a Brabender or Banbury. The difunctional compound is blended with the copolymer in the amount of 0.1 to 10 parts by weight of difunctional compound based on 100 parts by weight of copolymer. Next the blend is fed to an extruder, and 0.1 to 10 parts by weight of organo titanate based on 100 parts by weight of copolymer is injected into the extruder. It is best if the extruder is vented so that volatiles produced during the formation of the heat curable polymer can be removed. The devolitized heat curable polymer can then be further processed in any desired manner. For example, it may be coated onto a wire or cable. The polymer is then cured by heating it to a temperature of at least about 125° C. and more preferably between 150° C. to 315° C.

(2) A second method of making the heat curable polymer is to first react difunctional compound with from 5 to 1000 parts by weight based on 100 parts by weight of the difunctional compound of organotitanate at temperature of from 25° C. to 250° C., more preferably from 100° C. to 200° C. The reaction is preferably carried out in solvent, such as benzene. Volitile material is then removed from the reaction product. The devolatilized product may be blended with ethylene homopolymer, rubber or any inert polymer, i.e. any polymer that will not react with the reaction product. This blend provides a useful crosslinking agent that may be stored and later mixed with alkylene-alkyl acrylate copolymer.

This second method has the advantage of not requiring further devolitilization and of avoiding the need to store organo titanate, which deteriorates when exposed to atmospheric moisture.

To complete formation of the heat curable polymer, the devolitilized reaction product is blended with alkylene-alkyl acrylate copolymer.

(3) A third method is to blend alkylene-alkyl acrylate copolymer, from 0 to 10 parts by weight based on 100 parts by weight of copolymer of difunctional compound and from 0.1 to 10 parts by weight based on 100 parts by weight of titanium chelate. Upon heating, the mixture will cure. However, volitile compounds will evolve, so cure must take place at elevated pressure if void-free product is desired. This method has the advantage of not requiring storage of organo titanates, which deteriorate in atmospheric moisture faster than the titanium chelate.

THE CURED PRODUCT

Upon curing, the product formed has at least the following units:

(a) alpha olefin units having the formula:

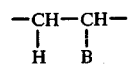

wherein B is selected from the group consisting of hydrogen, $C_1$ to $C_{16}$ alkyl, $C_1$ to $C_{16}$ aryl, $C_1$ to $C_{16}$ alkaryl or combinations thereof, said alpha olefin units being present in the copolymer to the extent of at least 22 weight percent;

(b) cross-linked bridges of the formula:

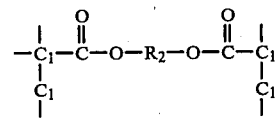

wherein $C_1$ is a carbon atom in a polymer chain, and $R_2$ is a divalent organic radical terminated with other than aryl.

If the preferred difunctional compounds are used, $R_2$ will comprise:

$-(CH_2)_a-$ wherein a is an integer of 2 to 20;

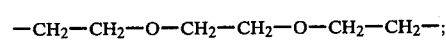

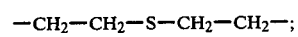

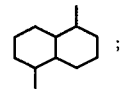

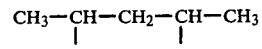

-continued $$-CH_2-\langle\bigcirc\rangle-CH_2-; \quad -CH_2-\langle\bigcirc\rangle^{CH_2-};$$

$$-CH_2-\langle\bigcirc\rangle^{-CH_2}$$

$$-CH_2-CH_2-O-\langle\bigcirc\rangle^{Br_d}_{\phantom{Br}}\overset{CH_3}{\underset{CH_3}{C}}-\langle\bigcirc\rangle^{Br_d}-O-CH_2-CH_2-$$

wherein d is an integer of 1 to 4; and $$-CH_2-\overset{Br}{\underset{\underset{Br}{CH_2}}{\overset{CH_2}{C}}}-CH_2-;$$

EXAMPLES

The following examples will serve to illustrate the invention.

EXAMPLES 1 TO 4

The ingredients in Table I were blended in a Brabender mixer at a temperature below 125° C.

Each mixture was then pressed into a plaque and subjected to the Monsanto Rheometer cure test. This test procedure is fully set forth in U.S. Pat. No. 4,018,852 issued Apr. 19, 1977, which patent is incorporated herein by reference. Briefly, FIG. 1 of said patent shows the typical Monsanto Rheometer curve. The cure level (highest cross-link density) is designated as H. It is measured in terms of inch-pounds of torque on the rheometer test equipment. A higher value for H corresponds to a higher cross-link density.

The cured disks from the above tests were measured for decalin extractables according to Method A of ASTM D-2765. The decalin insoluble portion of the polyethylene compound is a quantitative measure of its degree of cure. The larger percentage extractables, the lower the degree of cure.

Other specimens were pressed into plaques and cured at 190° C. at 15,000 psig for 15 minutes and tested for tensile strength and elongation under ASTM-D-412-68 and for 60-cycle dielectric constant and dissipation under ASTM-D-150-74. The results appear in Table II.

TABLE I

| | Amount in Mixture, grams | | | |
|---|---|---|---|---|
| Example No. | 1 | 2 | 3 | 4 |
| E/EA copolymer[1] | 198.5 | 198.5 | 198.5 | 198.5 |
| Tetraisopropyl Titanate (TIPT) | 9.9 | 5.94 | 5.94 | 5.94 |
| Decanediol | 13.9 | 8.34 | — | — |
| Dodecanediol | — | — | 10.0 | 10.0 |
| Calcined Clay filler | 83 | 83 | 83 | — |
| Silica filler | — | — | — | 83 |

TABLE I-continued

| | Amount in Mixture, grams | | | |
|---|---|---|---|---|
| Example No. | 1 | 2 | 3 | 4 |
| Heat Stabilizer[2] | 1.5 | 1.5 | 1.5 | 1.5 |

[1] ethylene-ethyl acrylate copolymer containing 18-20 percent ethyl acrylate, having melt index of 4.5.
[2] flectol H ® available from Vanderbilt Corp, 30 Winfield St., Norwalk, Ct. 06855.

TABLE II

| | Example No. | | | |
|---|---|---|---|---|
| | 1 | 2 | 3 | 4 |
| H Value | 89 | 72 | 72 | 80 |
| % Decalin extractables | 4.72 | 7.66 | 7.26 | 5.45 |
| Tensile strength (PSI) | 1450 | 1500 | 1470 | 1240 |
| Elongation | 210 | 257 | 250 | 230 |
| Dielectric constant | 3.313 | 3.256 | 3.284 | 3.318 |
| Dissipation factor | 0.00306 | 0.00270 | 0.00287 | 0.0179 |
| After Aging 1 week at 120° C. | | | | |
| Tensile Strength | 1560 | 1570 | 1600 | 1240 |
| % Elongation | 120 | 177 | 190 | 137 |

The results tabulated above show that the material was crosslinked and displayed properties useful as electrical insulation for wire or cable.

EXAMPLES 5 TO 7

The procedure for Example 1 to 4 was repeated using the ingredients shown in Table III.

TABLE III

| | Amount in mixture, grams | | |
|---|---|---|---|
| Example No. | 5 | 6 | 7 |
| Copolymer[1] | 280 | 198.5 | 198.5 |
| TIPT | 13.1 | 6.2 | 6.2 |
| Difunctional compound[2] | 12.1 | 5.75 | 5.75 |
| Talc[4] | — | 83 | — |
| Treated Clay | — | — | 83 |
| Heat Stabilizer[3] | 1.5 | 1.5 | 1.5 |

[1] same copolymer as Example I.
[2] compound having the formula HO—(CH$_2$)$_2$—S—(CH$_2$)$_2$—OH
[3] same heat stabilizer as Example I.
[4] Mistron ZSC ®, Cypress Industrial Minerals, Trenton, N.J.

Results of tests performed on the material are listed in Table IV.

TABLE IV

| Example No. | 5 | 6 | 7 |
|---|---|---|---|
| H Value | 65 | 53 | 40 |
| Tensile strength (PSI) | 1410 | 1640 | 1630 |
| % Elongation | 370 | 440 | 440 |

These results show that a crosslinked polymer having suitable physical properties was obtained. Notice in particular the surprisingly high elongation obtained with the particular difunctional compound, HO—(CH$_2$)$_2$—S—(CH$_2$)$_2$—OH, used in Examples 5, 6 and 7.

EXAMPLES 8 AND 9

The procedure for Examples 1 to 4 was repeated using the ingredients shown in Table V.

TABLE V

| Example No. | 8 | 9 |
|---|---|---|
| Copolymer[1] | 265 | 265 |
| TIPT | 7.3 | 4.9 |
| Decanediol | 9.75 | 6.5 |

TABLE V-continued

| Example No. | 8 | 9 |
|---|---|---|
| Heat Stabilizer[2] | 1.5 | 1.5 |

[1]Ethylene-ethyl acrylate copolymer containing 2 weight % ethyl acrylate, having melt index of 2.
[2]Same heat stabilizer as Example 1.

The material exhibited the properties shown in Table VI.

TABLE VI

| Example No. | 8 | 9 |
|---|---|---|
| Tensile strength (PSI) | 2210 | 2060 |
| % Elongation | 600 | 585 |
| % Decalin extractables[1] | 24.76 | 27.76 |

[1]After curing at 182° C.

The results listed in Table VI show that a crosslinkable polymer is obtained with ethylene-ethyl acrylate copolymer containing only 2% ethyl acrylate.

EXAMPLES 10 TO 14

These examples illustrate the invention using various difunctional compounds, namely, 1,5 pentanediol, 1,5 pentanediol diacetate, 2,5 hexanediol, 1,4 butanediol diadipate, and cyclohexane dimethanol having the formula

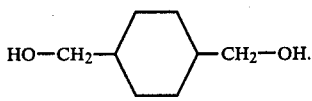

The procedure for Examples 1 to 4 was followed with the ingredients listed in Table VII.

TABLE VII

| Example No. | 10 | 11 | 12 | 13 | 14 |
|---|---|---|---|---|---|
| Copolymer[1] | 45 | 45 | 45 | 45 | 45 |
| 1,5 Pentanediol | 1.45 | | | | |
| 1,5 Pentanediol diacetate | | 2.62 | | | |
| 2,5 Hexanediol | | | 1.6 | | |
| 1,4 Butanediol diadipate | | | | 4.4 | |
| Cyclohexane dimethanol | | | | | 2.0 |
| TIPT | 1.7 | 1.7 | 1.7 | 1.7 | 0.95 |

[1]Same copolymer as for Example I.

These materials exhibited the results listed in Table VIII.

TABLE VIII

| Example No. | 10 | 11 | 12 | 13 | 14 |
|---|---|---|---|---|---|
| H Value | 36 | 61 | 8 | 8 | 18 |
| % Decalin extractables | 18.26 | 11.32 | 49.11 | 58.06 | 37.5 |

Examples 10 to 14 show that a crosslinked polymer was obtained in all cases.

EXAMPLES 15 TO 18

These examples illustrate practice of the invention using yet another group of difunctional compounds, specifically ethylene glycol, ethylene glycol diacetate, and a brominated diol. The procedure for Examples 1 to 4 was followed with the ingredients in Table IX except as noted.

TABLE IX

| | Amount in mixture, grams | | | |
|---|---|---|---|---|
| Example No. | 15 | 16 | 17 | 18 |
| Copolymer[1] | 45 | 45 | | |
| Copolymer[2] | | | 256.6 | |
| Copolymer Compound[5] | | | | 254.4 |
| Ethylene glycol | 0.5 | | | |
| Ethylene glycol diacetate | | 1.2 | | |
| Brominated diol[4] | | | 35.8 | 25.5 |
| TIPT | 1.0 | 1.0 | 7.0 | 6.6 |
| Heat stabilizer[3] | | | 1.6 | 1.5 |
| Filler[6] | | | 15.8 | 12 |

[1]Same copolymer as Example 1.
[2]Ethylene-ethyl acrylate copolymer containing 15-17 weight percent ethyl acrylate, having melt index of 1.6
[3]Same heat stabilizer as for Example 1.
[4]Compound having the formula:

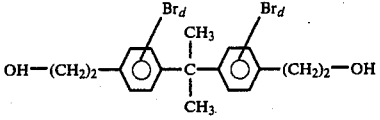

sold under the trade name SA-50 by Great Lakes Chemical Corp. Lafayette, Indiana.
[5]Talc filled polyethylene copolymer containing the copolymer of foot note [2] sold under the trade name DFNA-6989 by Union Carbide Corp, 270 Park Ave, NY. NY.
[6]Superpflex 200 ®, sold by Pfizercorp., Easton, Pa.

These materials exhibited the results listed in Table X.

TABLE X

| Example No. | 15 | 16 | 17 | 18 |
|---|---|---|---|---|
| H Value | 13[1] | 13[1] | — | — |
| Tensile strength (psi) | — | — | 2560 | 1540 |
| % Elongation | — | — | 613 | 347 |
| % Deformation[2] at 121° C. | — | — | 68.5 | 43.4 |

[1]plaque cured at 500° F. before rheometer test,
[2]ASTM-D-621

The results listed in Table X show that a crosslinked copolymer was obtained. It is believed that the brominated difunctional compound of Examples 17 and 18 imparts flame retardancy to those polymers.

EXAMPLES 19 AND 20

Thus far, the examples have shown the embodiment of the invention wherein the copolymer, difunctional compound, and titanate are all mixed and heated to form a heat curable polymer. Examples 19 and 20 illustrate the embodiment of the invention wherein the difunctional compound is prereacted with the titanate, prior to mixing with copolymers.

Five hundred cc of benzene was heated and 50 cc was boiled away to assure dryness. Decanediol (112 g.) was dissolved in the remaining hot benzene and 80. g of TIPT diluted with 84 cc benzene was added to the benzene-decanediol mixture dropwise over a period of ½ hour. A reaction took place, evidenced by the liberation of heat and build-up of a glassy substance on the bottom of the reactor. The benzene was boiled away and the material, i.e. the TIPT-decanediol adduct, was collected and pulverized. The adduct was mixed with copolymer and other ingredients in the amounts listed in Table XI.

TABLE XI

| Example No. | 19 | 20 |
|---|---|---|
| Copolymer[1] | 198.5 | |
| Copolymer[2] | | 265 |
| Adduct | 17.3 | 13 |

TABLE XI-continued

| Example No. | 19 | 20 |
|---|---|---|
| Talc[3] | 83 | |
| Heat Stabilizer[2] | 1.5 | 1.5 |

[1]Same copolymer as in Example 1.
[2]Same copolymer as in Example 8.
[3]Same heat stabilizer as in Example 1.
[4]Same filler as Example 6.

The results of testing the compounds are shown in Table XII.

TABLE XII

| Example No. | 19 | 20 |
|---|---|---|
| H valve | 65 | 8 |
| Tensile strength (psi) | 1380 | 1580 |
| % Elongation | 200 | 595 |
| % Decaline extractable | 2.90 | 36 |

The results listed in Table XII shows that a crosslinked polymer was obtained in both cases.

EXAMPLE 21 TO 24

These examples illustrate the embodiment of the invention in which titanium chelate are used. The mixing and testing procedure are the same as those of Example 1.

TABLE XIII

| Example No. | Amount, grams | | | |
|---|---|---|---|---|
| | 21 | 22 | 23 | 24 |
| Copolymer[1] | 48 | 48 | 48 | 48 |
| Titanium Acetyl Acetonate | 3.4 | | | |
| Triethanolamine Titanium chelate | | 4.1 | | |
| Tetraoctylene glycol Titanium chelate | | | 4.3 | |
| Lactic acid titanium chelate | | | | 2.4 |
| Decanediol | 2.8 | 2.8 | 2.8 | 2.8 |

[1]Same copolymer as Example 1.

The compounds were tested. The results are listed in Table XIV.

TABLE XIV

| Example No. | 21[1] | 22[1] | 23[2] | 24[1] |
|---|---|---|---|---|
| H-Valve | 86 | 86 | 65 | 95 |
| % decalin extractable | 6.62 | 8.18 | 7.88 | 4.15 |

[1]Compound was pressed and cured at 500° F.
[2]Compound was pressed and cured at 600° F.

The data in Table XIV indicate that a crosslinked polymer was obtained in Examples 21 to 24.

EXAMPLES 25 TO 27

In Example 25, the diol, i.e. the difunctional compound, was generated in situ by the chelate. In Example 26, the chelate was generated in situ from TIPT and triethanolamine, forming triethanolamine titanium chelate. In Example 27, the tetraoctylene glycol titanium chelate was formed in situ from 2-ethyl-1,3-hexane diol and TIPT.

TABLE XV

| Example | Amount, grams | | |
|---|---|---|---|
| | 25 | 26 | 27 |
| Copolymer[1] | 338 | 338 | |

TABLE XV-continued

| Example | Amount, grams | | |
|---|---|---|---|
| | 25 | 26 | 27 |
| Copolymer[2] | | | 250 |
| 2-ethyl-1,3-hexanediol | | | 23.24 |
| Titanium chelate | 16.2[3] | | |
| Decanediol | | 10.5 | |
| TIPT | | 7.6 | 11.31 |
| Triethanol amine | | 7.83 | |
| Heat Stabilizer[4] | 1.7 | 1.7 | 1.5 |

[1]Same copolymer as Example 1.
[2]Ethylene-ethyl acrylate copolymer containing 14% ethyl acrylate, having melt index of 2.0.
[3]Same chelate as Example 23.
[4]Same heat stabilizer as Example 1.

The results of testing the compound after curing at high temperatures are listed in Table VI.

| Example | 25[1] | 26[2] | 27[1] |
|---|---|---|---|
| H valves | 17.5 | 77 | 11.2 |
| % Decalin extractables | 24.2 | 7.52 | 30.8 |

[1]Cured at 600° C.
[2]Cured at 500° C.

The results show that in Examples 25 to 27, all performed in accordance with the invention, a crosslinked polymer was obtained.

What is claimed is:

1. A process for making a heat-curable polymer comprising the steps of:
   (a) preparing a mixture comprising:
      alkylene-alkyl acrylate copolymer;
      from 0.1 to 10 parts by weight based on 100 parts by weight of copolymer of difunctional compound having the formula $$R_1-R_2-R_3$$

wherein $R_1$ and $R_3$ are independently selected from the group consisting of —OH, —SH,

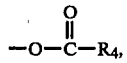

wherein $R_4$ is $C_1$ to $C_{20}$ hydrocarbon; $R_2$ is a divalent organic radical terminated with other than aryl,
      from 0.1 to 10 parts by weight based on 100 parts by weight of the copolymer of organo titanate;
   (b) heating said mixture to temperature of between the melting temperature of the copolymer and about 200° C.

2. The process of claim 1 wherein the organotitanate is selected from the group consisting of: tetramethyl titanate, tetraethyl titanate, tetraisopropyl titanate, tetrabutyl titanate, tetraoctyl titanate, tetra steryl titanate, isopropyl (dilauryl mysityl) titanate and combinations thereof.

3. The process of claim 1 wherein said difunctional compound is selected from the group consisting of:

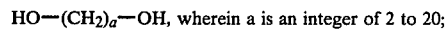

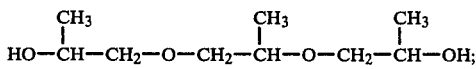

-continued

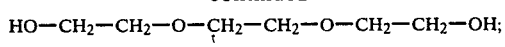

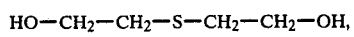

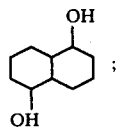

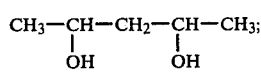

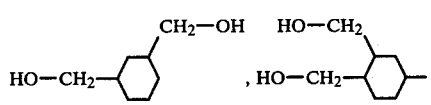

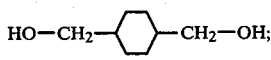

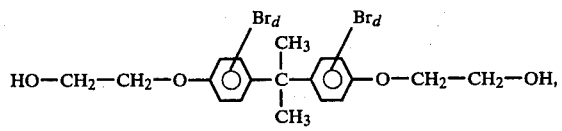

wherein d is an integer of 1 to 4;
dibromoneopentyl glycol; and

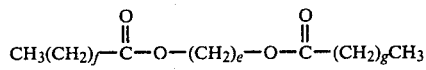

wherein e is an integer of 2 to 20, and f and g are integers of 0 to 18.

4. The process of claim 1 wherein the copolymer comprises ethylene-ethyl acrylate copolymer.

5. The process of claim 2 wherein the copolymer comprises ethylene-ethyl acrylate copolymer.

6. The process of claim 3 wherein the copolymer comprises ethylene-ethyl acrylate copolymer.

7. The process of claim 1 wherein the copolymer comprises ethylene-butyl acrylate copolymer.

8. The heat-curable polymer produced by the process of claim 1.

9. The heat-curable polymer produced by the process of claim 2.

10. The heat-curable polymer produced by the process of claim 3.

11. The heat-curable copolymer produced by the process of claim 4.

12. The heat-curable copolymer produced by the process of claim 5.

13. The heat-curable polymer produced by the product of claim 6.

14. The heat curable polymer produced by the process of claim 7.

15. The process of claim 1 wherein
said alkylene-alkyl acrylate copolymer is ethylene-ethyl acrylate;
said difunctional compound is decanediol; and
said organo titanate is tetra isopropyl titanate.

* * * * *

UNITED STATES PATENT AND TRADEMARK OFFICE
CERTIFICATE OF CORRECTION

PATENT NO. : 4,351,926
DATED : September 28, 1982
INVENTOR(S) : Michael John Keogh It is certified that error appears in the above—identified patent and that said Letters Patent is hereby corrected as shown below:

Column 6, line 12; the formula should read

-- $CH_3(CH_2)_f \overset{O}{\underset{\|}{C}} -O (CH_2)_e O - \overset{O}{\underset{\|}{C}} (CH_2)_g CH_3$ --.

Column 7, line 27; "inro-" should read --inor--.
Column 7, line 56; "devolitized" should read --devolatized--
Column 7, line 67; "volitile" should read --volatile--
Column 8, line 7; "devolitilization" should read --devolatilization--. Column 8, line 11; "devolitilized" should read -devolatilized--. Column 8, line 18; "volitile" should read --volatile--. Claim 2, line 4; "steryl" should read --stearyl--. Claim 2, line 5; "mysityl" should read --myristyl--.

Signed and Sealed this

Eleventh Day of October 1983

[SEAL]

Attest:

GERALD J. MOSSINGHOFF

Attesting Officer    Commissioner of Patents and Trademarks